(12) United States Patent
Shigeeda

(10) Patent No.: US 10,009,314 B2
(45) Date of Patent: Jun. 26, 2018

(54) IP ADDRESS DISTRIBUTION SYSTEM, SWITCH APPARATUS, AND IP ADDRESS DISTRIBUTION METHOD

(71) Applicant: Mitsubishi Electric Corporation, Chiyoda-ku, Tokyo (JP)

(72) Inventor: Tetsuya Shigeeda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 197 days.

(21) Appl. No.: 14/903,703

(22) PCT Filed: Sep. 12, 2013

(86) PCT No.: PCT/JP2013/074722
§ 371 (c)(1),
(2) Date: Jan. 8, 2016

(87) PCT Pub. No.: WO2015/037102
PCT Pub. Date: Mar. 19, 2015

(65) Prior Publication Data
US 2016/0164829 A1 Jun. 9, 2016

(51) Int. Cl.
*G06F 15/16* (2006.01)
*H04L 29/12* (2006.01)

(52) U.S. Cl.
CPC ........ *H04L 61/2007* (2013.01); *H04L 61/103* (2013.01); *H04L 61/2015* (2013.01); *H04L 61/2046* (2013.01)

(58) Field of Classification Search
CPC ................. H04L 61/2007; H04L 45/00; H04L 29/12377; H04L 61/2517
USPC ......................................................... 709/245
See application file for complete search history.

(56) References Cited

U.S. PATENT DOCUMENTS 8,743,873 B2   6/2014 Shigeeda et al.
8,782,239 B2   7/2014 Okuno et al.
(Continued)

FOREIGN PATENT DOCUMENTS

JP   2002-368763 A   12/2002
JP   2004-23238 A    1/2004
(Continued)

OTHER PUBLICATIONS

International Search Report (PCT/ISA/210) dated Dec. 17, 2013, by the Japanese Patent Office as International Searching Authority for International Application No. PCT/JP2013/074722.
(Continued)

*Primary Examiner* — Wing F Chan
*Assistant Examiner* — Andrew Woo
(74) *Attorney, Agent, or Firm* — Buchanan Ingersoll & Rooney PC

(57) ABSTRACT

The present invention provides an IP address distribution system including a network that is formed by a switch and an IP address distribution apparatus that is connected to the network. When receiving a signal including a distribution IP address, which is an IP address to be distributed to an apparatus that requests the IP address by the IP address distribution apparatus, the switch rewrites one part or entire of the distribution IP address included in the received signal to a value corresponding to a port that relays the signal.

6 Claims, 9 Drawing Sheets

(56) References Cited

U.S. PATENT DOCUMENTS

| | | |
|---|---|---|
| 8,902,789 B2 | 12/2014 | Maruta et al. |
| 2004/0230703 A1 | 11/2004 | Sukigara |
| 2007/0022211 A1 | 1/2007 | Shimizu et al. |
| 2011/0280158 A1* | 11/2011 | Shigeeda .......... H04L 29/12028 370/255 |
| 2011/0299538 A1 | 12/2011 | Maruta |
| 2012/0023206 A1* | 1/2012 | Kusama ............ H04L 12/40032 709/220 |

FOREIGN PATENT DOCUMENTS

| | | |
|---|---|---|
| JP | 2006-197487 A | 7/2006 |
| JP | 2007-36374 A | 2/2007 |
| JP | 2011-170591 A | 9/2011 |
| JP | 2011-205582 A | 10/2011 |
| JP | 2011-223396 A | 11/2011 |
| WO | WO 2010/087258 A1 | 8/2010 |
| WO | WO 2010/087259 A1 | 8/2010 |
| WO | WO 2010/095324 A1 | 8/2010 |

OTHER PUBLICATIONS

Written Opinion (PCT/ISA/237) dated Dec. 17, 2013, by the Japanese Patent Office as the International Searching Authority for International Application No. PCT/JP2013/074722.

Douglas E. Comer, "Internetworking with TCP/IP vol. 1, $5^{th}$ Edition", pp. 57-68, pp. 403-416, (2005).

* cited by examiner

FIG.3

| PORT NUMBER | LOWER 8 bits OF IP ADDRESS |
|---|---|
| 1 | 1 |
| 2 | 2 |
| 3 | 3 |
| 4 | 4 |
| 5 | 5 |

192.168.1.xxx

FIG.4

| PORT NUMBER | DISTRIBUTION IP ADDRESS |
|---|---|
| 1 | 192.168.1.1 |
| 2 | 192.168.1.2 |
| 3 | 192.168.1.3 |
| 4 | 192.168.1.4 |
| 5 | 192.168.1.5 |

ARP Table

| IP ADDRESS | MAC ADDRESS |
|---|---|
| 192.168.1.3 | FF-FF-FF-FF-FF-FF |
|  |  |

ARP Table(UPDATE BY RESPONSE)

| IP ADDRESS | MAC ADDRESS |
|---|---|
| 192.168.1.3 | 00-08-A1-0D-6A-11 |
|  |  |

DISTRIBUTED IP ADDRESS MANAGEMENT TABLE

| MAC ADDRESS | IP ADDRESS (TEMPORARY) | IP ADDRESS (ARP RESPONSE) |
|---|---|---|
| 00-08-A1-0D-6A-11 | 192.168.1.100 | --.--.--.-- |
|  |  |  |

DISTRIBUTED IP ADDRESS MANAGEMENT TABLE (UPDATE BY ARP RESPONSE)

| MAC ADDRESS | IP ADDRESS (TEMPORARY) | IP ADDRESS (ARP RESPONSE) |
|---|---|---|
| 00-08-A1-0D-6A-11 | 192.168.1.100 | 192.168.1.3 |
|  |  |  |

| PORT NUMBER | LOWER 8 bits OF IP ADDRESS |
|---|---|
| 1 | 11 |
| 2 | 12 |
| 3 | 13 |
| 4 | 14 |
| 5 | 15 |

| PORT NUMBER | LOWER 8 bits OF IP ADDRESS |
|---|---|
| 1 | 21 |
| 2 | 22 |
| 3 | 23 |
| 4 | 24 |
| 5 | 25 |

IP ADDRESS DISTRIBUTION SYSTEM, SWITCH APPARATUS, AND IP ADDRESS DISTRIBUTION METHOD

FIELD

The present invention relates to an IP address distribution system, a switch apparatus, and an IP address distribution method.

BACKGROUND

TCP/IP often used as a communication protocol between apparatuses uses IP addresses as information for identifying the apparatuses. When TCP/IP is used, IP addresses uniquely defined need to be allocated to apparatuses on a network, respectively.

As a method of determining an IP address for each of apparatuses on a network, a method in which an IP address is provided to each of the apparatuses without any overlap, the IP address is recorded in a recording device included in each of the apparatuses, and each of the apparatuses uses the recorded IP address at the time of startup is employed.

As another method of determining an IP address for each of apparatuses on a network, an RARP (Reverse Address Resolution Protocol) is used. When the RARP is applied, each of the apparatuses performs broadcast transmission of an RARP message to the network at the time of startup. In response to the RARP message, an RARP server on the network distributes an IP address to the transmission source apparatus via the network.

There are also a BOOTP (Boots Trap Protocol) and a DHCP (Dynamic Host Configuration Protocol) as IP address distribution methods alternative to the RARP. In either scheme, a server that manages IP addresses distributes an IP address in response to a request from an apparatus, thereby determining the IP address (see, for example, Non Patent Literature 1).

CITATION LIST

Non Patent Literature

Non Patent Literature 1: Internetworking with TCP/IP Vol. 1, 4th edition, by Douglas E. Comer (Kyoritsu Shuppan)

SUMMARY

Technical Problem

In the IP address distribution methods mentioned above, a server that has received an IP-address distribution request assigns an IP address to a request source device. However, because IP address assignment is not performed considering a physical configuration of the network, the following problems occur.

For example, a case where TCP/IP is used in a network having a device configuration previously designed is considered. In this network, arrangement of network devices is already defined and thus, when apparatus replacement is required due to a malfunction of an apparatus, it is preferable for the network operation that the same (or a relevant) IP address as that having been provided to the malfunctioning apparatus is provided to the corresponding apparatus after the replacement according to device arrangement. When an IP address is provided according to the device arrangement, convenience is improved in management of the devices. For example, when a communication failure occurs, involved devices can be easily specified. To provide the same or relevant IP address as that having been provided to an apparatus before replacement to an apparatus after the replacement, an operator writes a desired IP address during apparatus installation. However, if an IP address corresponding to an installation position can be provided automatically after apparatus replacement, ease of the operation is improved. Although an operation error may occur when setting is manually performed by a person, the operation error can be prevented by automation. Therefore, it is desirable that an IP address corresponding to the device arrangement is distributed automatically when an apparatus is installed.

The present invention has been achieved in view of the problems mentioned above, and an object of the present invention is to provide an IP address distribution system and an IP address distribution method that, when an apparatus to which an IP address is not provided is newly installed due to apparatus replacement or the like, can provide an IP address corresponding to an installation position to the newly-installed apparatus.

Solution to Problem

In order to solve the aforementioned problems, an IP address distribution system according to one aspect of the present invention is so constructed as to include: a network formed by a switch apparatus; and an IP address distribution apparatus connected to the network, wherein, when receiving a signal including a distribution IP address, which is an IP address to be distributed to an apparatus that requests the IP address by the IP address distribution apparatus, the switch apparatus rewrites one part or entire of the distribution IP address included in the received signal to a value corresponding to a port that relays the signal.

Advantageous Effects of Invention

According to the present invention, when relaying an IP address distribution message issued by the IP address distribution apparatus, the switch rewrites some or all of the bits forming the distribution IP address included in the message to a value corresponding to the port that is a relay destination. According to this structure, it is made possible to distribute an IP address in association with the position (installation position) of an apparatus on the physical line of the network. For example, even when an apparatus that receives a distributed IP address is replaced by another apparatus due to, for example, a failure, it is made possible to automatically assign the same IP address as that of the apparatus before replacement to a replaced apparatus.

BRIEF DESCRIPTION OF DRAWINGS

FIG. 3 is a diagram illustrating an example of a conversion table for the lower eight bits of a distribution IP address.

FIG. 4 is a diagram illustrating an example of a distribution IP address after rewriting is performed according to the conversion table.

DESCRIPTION OF EMBODIMENTS

Hereinafter, embodiments of an IP address distribution system and an IP address distribution method according to the present invention will be described in detail with reference to the drawings. The present invention is not limited by the embodiments.

First Embodiment

Figure 1:
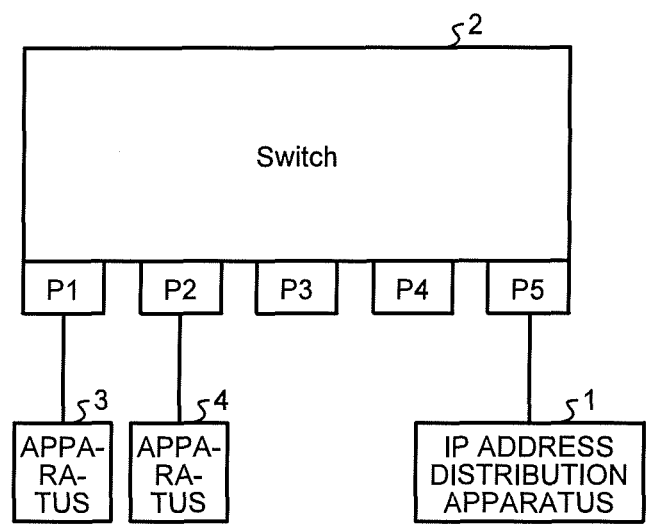
FIG. 1 is a diagram illustrating an example of the configuration of an IP address distribution system according to a first embodiment.

FIG. 1 is a diagram illustrating an example of the configuration of an IP address distribution system according to a first embodiment of the present invention. The IP address distribution system according to this embodiment includes an IP address distribution apparatus 1 and a switch 2 (or may be referred to as "switch apparatus") which is an Ethernet (registered trademark) switch. The IP address distribution apparatus 1 is connected to a port P5 of the switch 2. An apparatus 3 is connected to a port P1 of the switch 2 and an apparatus 4 is connected to a port P2. In this embodiment, a mechanism in which IP addresses are assigned to the apparatuses 3 and 4 will be described.

Figure 2:
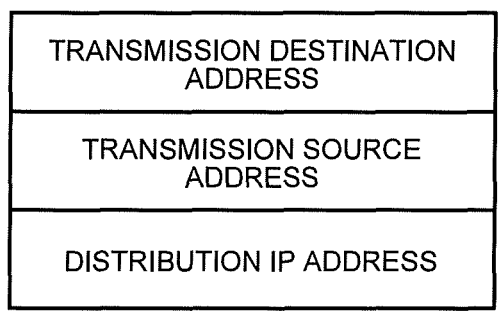
FIG. 2 is a diagram illustrating an example of the structure of an IP address distribution message.

FIG. 2 is a diagram illustrating an example of the structure of an IP address distribution message which is used by the IP address distribution apparatus 1 to distribute IP addresses to the apparatuses in the IP address distribution system according to this embodiment.

As illustrated in FIG. 2, the IP address distribution message has regions for storing a transmission destination address, a transmission source address, and a distribution IP address. The address of an apparatus (an apparatus which requests the distribution of an IP address), which is a transmission destination of the message, is set in the transmission destination address region. The address of the IP address distribution apparatus 1, which is a transmission source of the message, is set in the transmission source address region. The IP address to be allocated to the apparatus, which is a transmission destination of the message, is set in the distribution IP address region. In general, a 32-bit IP address is used in IPv4.

In the switch 2, the IP address distribution message illustrated in FIG. 2 which is transmitted from the IP address distribution apparatus 1 is relayed to a port to which the apparatus indicated by the transmission destination address is connected. When transmitting the IP address distribution message, the switch 2 rewrites the value of the lower eight bits of the IP address, which is set in the distribution IP address region of the IP address distribution message, in association with a port through which the IP address distribution message passes.

FIG. 3 is a diagram illustrating an example of a conversion table for the lower eight bits of the distribution IP address which correspond to each port of the switch 2. When outputting the IP address distribution message from each port, the switch 2 rewrites the value of the lower eight bits of the distribution IP address (the IP address stored in the distribution IP address region) in association with output ports, with reference to the conversion table illustrated in FIG. 3. For example, in a case in which the distribution IP address of the IP address distribution message which is input from the port P5 is 192.168.1.100, when outputting the IP address distribution message from each port, the switch 2 rewrites the distribution IP address according to FIG. 3. The rewritten distribution IP address is as illustrated in FIG. 4.

Figure 5:
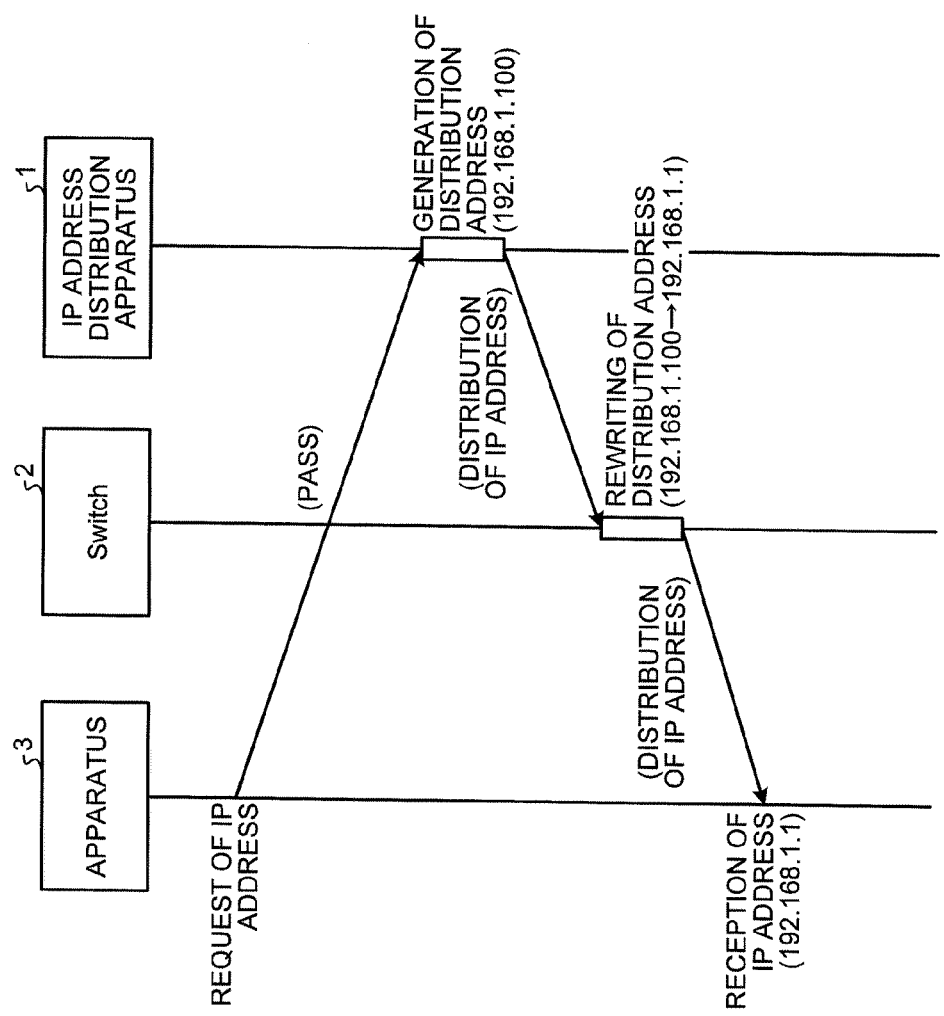
FIG. 5 is a sequence diagram illustrating an example of an IP address distribution operation.

For example, a process of distributing (allocating) an IP address to the apparatus 3 will be described with reference to the sequence diagram illustrated in FIG. 5. The apparatus 3 transmits an IP address request message to the IP address distribution apparatus 1 in a network, using broadcast. The destination address of the IP address request message is a broadcast address and the MAC address of the apparatus 3 is stored as a distribution source address. The IP address request message is transmitted to the IP address distribution apparatus 1 through the switch 2 by the use of the broadcast.

When receiving the IP address request message, the IP address distribution apparatus 1 generates a distribution IP address and issues an IP address distribution message in which the MAC address of the apparatus 3 is stored as the destination address, the MAC address of the IP address distribution apparatus 1 is stored as the distribution source address, and the generated distribution IP address (192.168.1.100 in FIG. 5) is stored in the distribution IP address region.

The IP address distribution message is transmitted to the apparatus 3 through the port P1 of the switch 2. When the IP address distribution message passes through the port P1 of the switch 2, a rewriting process is performed according to the conversion table illustrated in FIG. 3 and the distribution IP address of the IP address distribution message becomes 192.168.1.1. As a result, the IP address "192.168.1.1" is allocated to the apparatus 3.

An IP address "192.168.1.2" is allocated to the apparatus 4 by the same process.

When receiving the distributed IP addresses, the apparatuses 3 and 4 set their IP addresses to the distributed IP addresses (192.168.1.1 and 192.168.1.2) and start IP communication.

A case is considered in which a failure has occurred in the apparatus 3 and a replacement with another apparatus has been performed. The replaced apparatus issues an IP address request message and determines its IP address. The IP address "192.168.1.1" is allocated to the apparatus by the same process as that performed for the apparatus 3.

In the IP address distribution system, as an IP address distribution structure between the IP address distribution apparatus 1 and the apparatus, the IP address distribution apparatus 1 may operate as a DHCP server and the apparatus may operate as a DHCP client. The IP address distribution apparatus 1 performs, as its internal operation, an operation different from the operation of the DHCP server, but the apparatus can perform exactly the same operation as a general DHCP client.

Figure 6:
FIG. 6 is a diagram illustrating an example of a method for managing a distributed IP address.
Figure 6:

The distributed IP address recognized by the IP address distribution apparatus 1 is not identical to the IP address which is actually allocated to each apparatus, because the switch 2 rewrites the distribution IP address in the IP address distribution message. This state can be resolved by, for example, using the address resolution protocol (ARP). The IP address distribution apparatus 1 transmits an ARP request in which an IP address with an unknown MAC address is set with reference to, for example, an ARP table. When a response is received, the IP address distribution apparatus 1 registers the notified MAC address in the ARP table and stores an IP address notified by the ARP response as an IP address that has been distributed to a device of the MAC address notified by the ARP response, as illustrated in FIG. 6. For example, the IP address distribution apparatus 1 makes a table (distributed IP address management table) illustrated in FIG. 6 in which the MAC address, a provisional address distributed by the IP address distribution message, and the IP address notified by the ARP response are associated with one another and manages the table. In the example illustrated in FIG. 6, a MAC address "00-08-A1-0D-6A-11" is notified by means of an ARP response to the ARP request for an IP address "192.168.1.3". Therefore, the notified MAC address is registered in the ARP table and the IP address 192.168.1.3 that has sent the ARP request is registered in the distributed IP address management table in association with the notified MAC address 00-88-A1-0D-6A-11.

In this embodiment, an example in which the lower eight bits of the distribution IP address are rewritten has been described. However, all of the bits of the distribution IP address or a plurality of arbitrary bits of the distribution IP address may be rewritten in association with so as to be associated with each port of the switch. In this case, it is possible to achieve a system capable of distributing a fixed IP address, similarly to the above.

As such, in the IP address distribution system according to this embodiment, when relaying the IP address distribution message issued by the IP address distribution apparatus, the switch rewrites some or all of the bits of the distribution IP address included in the message to fixed values corresponding to ports (output ports) which are relay destinations. Therefore, it is made possible to distribute an IP address so as to correspond to the position (installation position) of an apparatus on a physical line of the network. For example, even when an apparatus which receives a distributed IP address is replaced due to, for example, a failure, it is made possible to automatically assign the same IP address as that of the apparatus before replacement to the replaced apparatus.

Second Embodiment

Figures 7, 8:
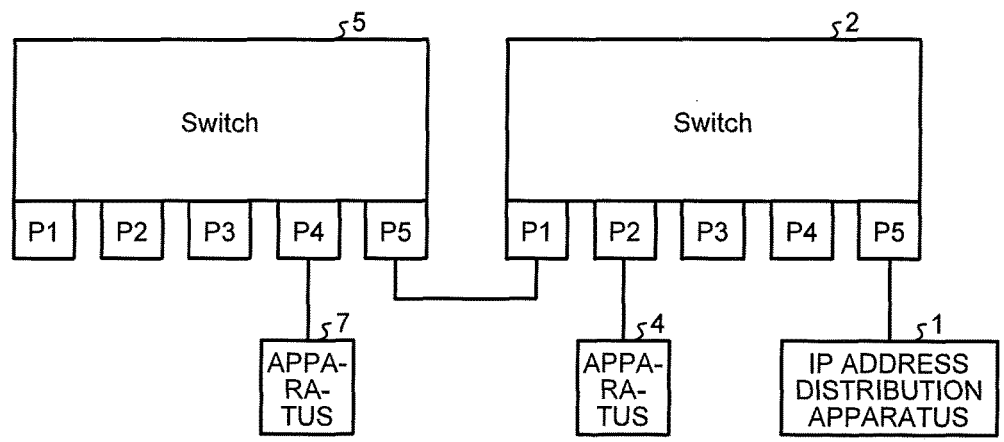
FIG. 7 is a diagram illustrating an example of the configuration of an IP address distribution system according to a second embodiment.
FIG. 8 is a diagram illustrating an example of a distribution IP address conversion table.

FIG. 7 is a diagram illustrating an example of the configuration of an IP address distribution system according to a second embodiment. In FIG. 7, the same apparatuses as those included in the IP address distribution system (FIG. 1) according to the first embodiment are denoted by the same reference numerals.

The IP address distribution system according to this embodiment includes an IP address distribution apparatus 1, and switches 2 and 5. A port P1 of the switch 2 is connected to a port P5 of the switch 5. Similarly to the first embodiment, the IP address distribution apparatus 1 is connected to the port P5 of the switch 2 and an apparatus 4 is connected to a port P2 of the switch 2. In addition, an apparatus 7 is connected to a port P4 of the switch 5.

In this embodiment, an operation of assigning an IP address to the apparatus 7 which communicates with the IP address distribution apparatus 1 through the two switches will be described. The operation when an IP address is distributed to the apparatus 4 is the same as that in the first embodiment. That is, when relaying the IP address distribution message (FIG. 2), the switch 2 rewrites the value of the distribution IP address according to the conversion table illustrated in FIG. 3.

FIG. 8 is a diagram illustrating an example of a conversion table (distribution IP address conversion table) used by the switch 5. Similarly to the switch 2, when relaying the IP address distribution message, the switch 5 rewrites the value of the distribution IP address. However, the switch 5 performs rewriting according to the conversion table illustrated in FIG. 8. That is, the switch 5 performs rewriting according to a conversion table different from the conversion table (FIG. 3) used by the switch 2.

A process of distributing the IP address to the apparatus 7 will be described with reference to a sequence diagram illustrated in FIG. 9. The apparatus 7 transmits an IP address request message to the IP address distribution apparatus 1 present in a network, by broadcast. The destination address of the IP address request message is a broadcast address and the MAC address of the apparatus 7 is stored as a distribution source address. The IP address request message is transmitted to the IP address distribution apparatus 1 through the switches 5 and 2 by the use of the broadcast.

When receiving the IP address request message, the IP address distribution apparatus 1 generates a distribution IP address and issues an IP address distribution message in which the MAC address of the apparatus 7 is stored as the destination address, the MAC address of itself (the IP address distribution apparatus 1) is stored as the distribution source address, and the generated distribution IP address (192.168.1.100) is stored in the distribution IP address region.

The IP address distribution message is relayed to the switch 5 through the port P1 of the switch 2. In this case, the switch 2 rewrites the distribution IP address of the IP address distribution message to be relayed according to the conversion table illustrated in FIG. 3. Specifically, the switch 2 rewrites 192.168.1.100 to 192.168.1.1. The IP address distribution message relayed by the switch 2 is relayed to the apparatus 7 through the port P4 of the switch 5. In this case, the switch 5 rewrites the distribution IP address of the relayed IP address distribution message according to the conversion table illustrated in FIG. 8. Specifically, the switch 2 rewrites 192.168.1.1 to 192.168.1.14. As a result, the IP address "192.168.1.14" is allocated to the apparatus 7.

When receiving the distributed IP address, the apparatus 7 sets the distributed IP address (192.168.1.14) as its IP address and starts IP communication.

In this embodiment, the switches 2 and 5 need to use different conversion tables. The conversion table used by each switch is fixedly set, for example, when the switch is installed. In addition, each switch has a plurality of conversion tables in advance and may switch the conversion table to be used, on the basis of contact information of the switch. In this case, if it is arranged such that even when a failure occurs in a switch, the same contact information is used, the same IP address can be distributed even when the switch is replaced.

As such, in the IP address distribution system according to this embodiment, a plurality of (two) switches rewrite the distribution IP address according to different conversion tables when relaying the IP address distribution message.

Therefore, similarly to the first embodiment, it is made possible to distribute an IP address in association with the position (installation position) of an apparatus on a physical line of the network. In addition, it is made possible to prevent a double allocation of an IP address.

Third Embodiment

In this embodiment, an IP address distribution operation of an IP address distribution system including a plurality of IP address distribution apparatuses will be described.

Figure 10:
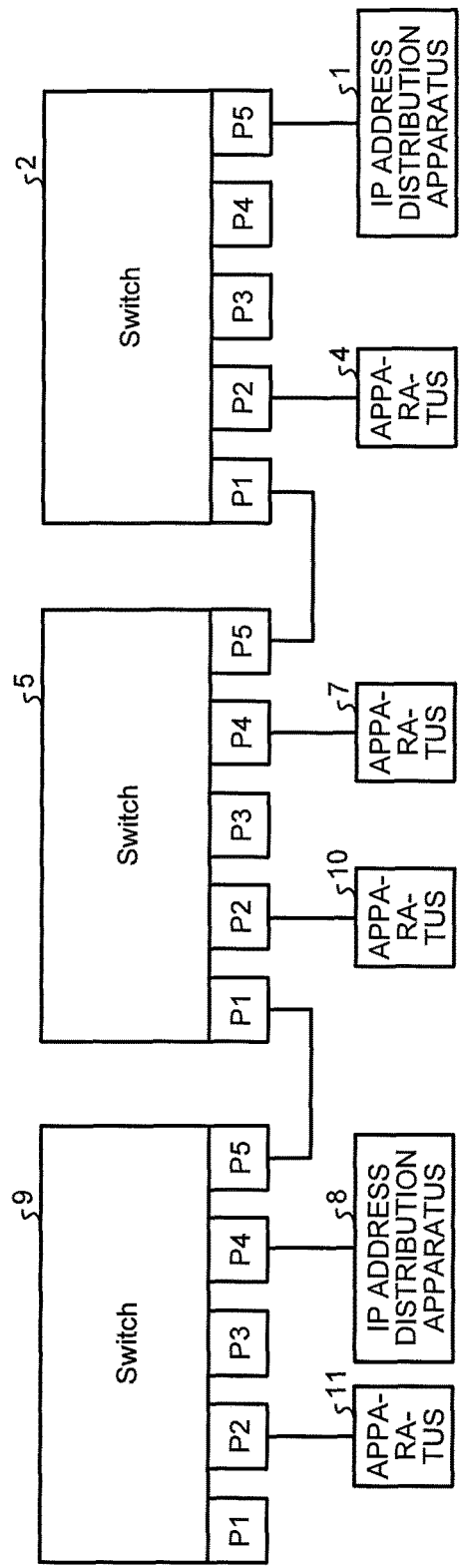
FIG. 10 is a diagram illustrating an example of the configuration of an IP address distribution system according to a third embodiment.

FIG. 10 is a diagram illustrating an example of the configuration of the IP address distribution system according to the third embodiment. In FIG. 10, the same apparatuses as those included in the IP address distribution systems (FIGS. 1 and 7) according to the first and second embodiments are denoted by the same reference numerals.

The IP address distribution system according to this embodiment includes IP address distribution apparatuses 1 and 8 and switches 2, 5, and 9. A port P1 of the switch 2 is connected to a port P5 of the switch 5, and a port P1 of the switch 5 is connected to a port P5 of the switch 9. Similarly to the first embodiment, the IP address distribution apparatus 1 is connected to a port P5 of the switch 2 and an apparatus 4 is connected to a port P2 of the switch 2. In addition, an apparatus 10 is connected to a port P2 of the switch 5 and an apparatus 7 is connected to a port P4 of the switch 5. An apparatus 11 is connected to a port P2 of the switch 9 and the IP address distribution apparatus 8 is connected to a port P4 of the switch 9.

Figures 11, 12:
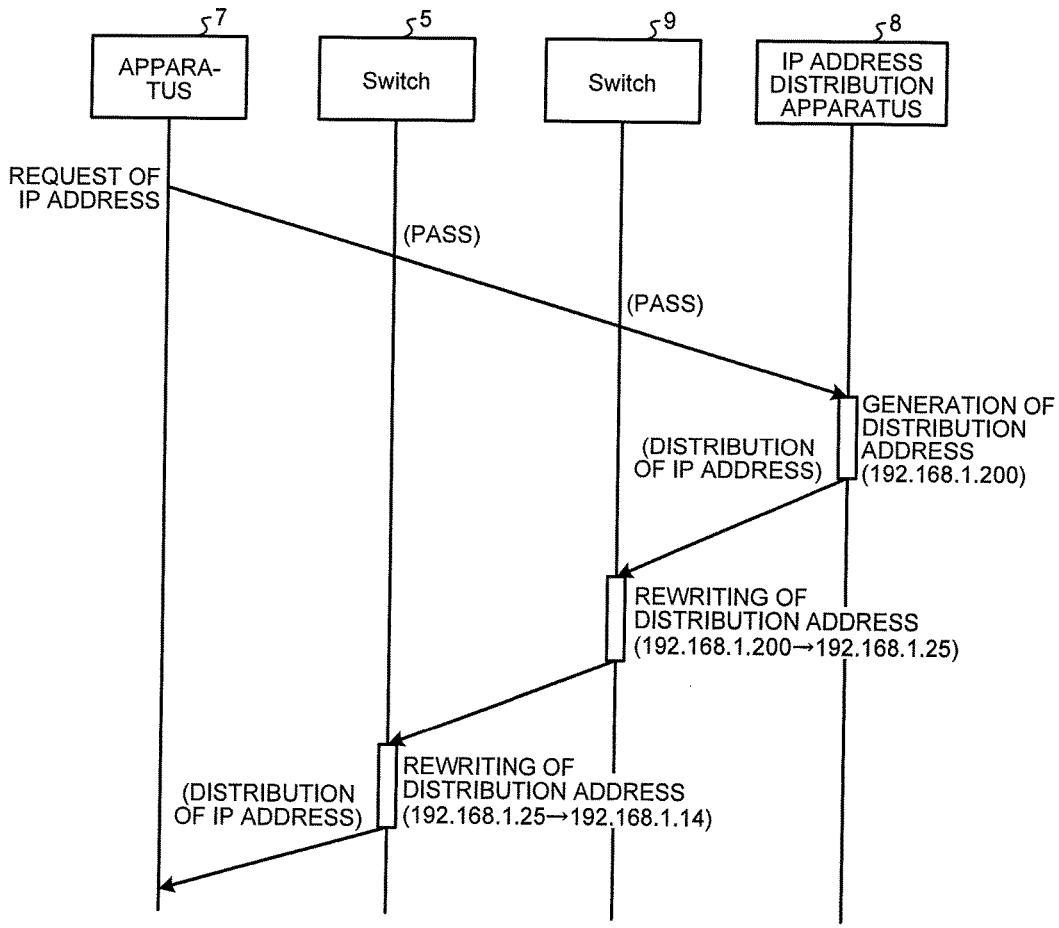
FIG. 11 is a diagram illustrating an example of a distribution IP address conversion table.
FIG. 12 is a sequence diagram illustrating an example of an IP address distribution operation.

FIG. 11 is a diagram illustrating an example of a conversion table (distribution IP address conversion table) used by the switch 9. Similarly to the switches 2 and 5, the switch 9 rewrites the value of a distribution IP address when relaying an IP address distribution message. However, the switch 9 performs rewriting according to the conversion table illustrated in FIG. 11. That is, the switch 9 performs rewriting according to a conversion table different from the conversion tables (FIGS. 3 and 8) used by the switches 2 and 5.

Next, an IP address distribution operation in the IP address distribution system according to this embodiment will be described. For example, an IP address distribution operation for the apparatus 7 will be described. Similarly to the first and second embodiments, the switch 2 uses the conversion table illustrated in FIG. 3 and the switch 5 uses the conversion table illustrated in FIG. 8.

When requesting the distribution of an IP address, the apparatus 7 stores a broadcast address as the destination address of the IP address request message, stores the MAC address of itself (the apparatus 7) as a distribution source address, and transmits the IP address request message. First, the IP address request message reaches the switch 5. The switch 5 relays the IP address request message to all ports other than the port that has received the message since the destination address of the received IP address request message is the broadcast address. The IP address request message relayed by the switch 5 reaches the switches 2 and 9. Similarly, the switches 2 and 9 relay the IP address request message to all ports other than the port that has received the message. As a result, the IP address request message reaches both the IP address distribution apparatus 1 and the IP address distribution apparatus 8.

When receiving the IP address request message transmitted from the apparatus 7, the IP address distribution apparatuses 1 and 8 determine the IP addresses to be distributed, generate an IP address distribution message in which the determined IP address is a distribution IP address, and transmits the thus generated IP address distribution message to the apparatus 7.

Figure 9:
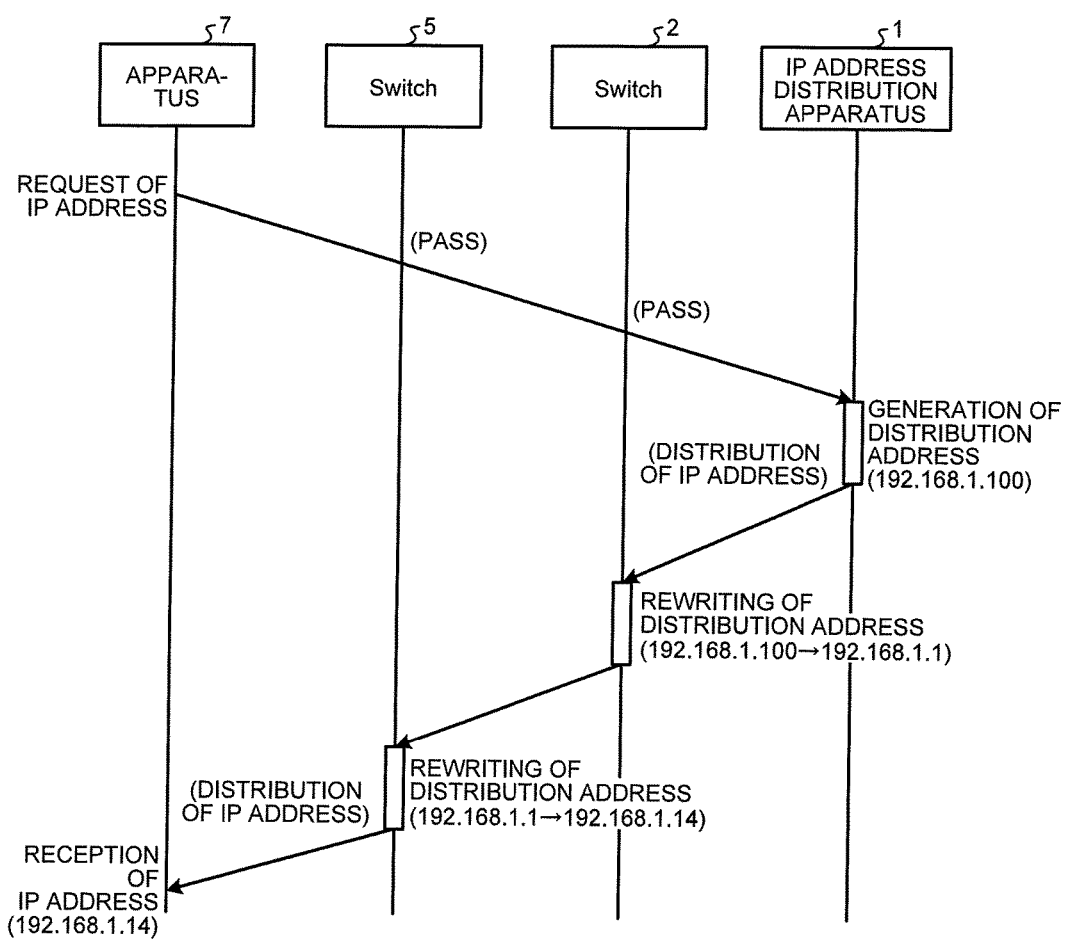
FIG. 9 is a sequence diagram illustrating an example of an IP address distribution operation.

The operation sequence of the IP address distribution performed by the IP address distribution apparatus 1 is the same as that in the second embodiment (see FIG. 9). The IP address distribution apparatus 1 transmits an IP address distribution message in which the distribution IP address is 192.168.1.100. The distribution IP address is rewritten when passing through the switches 2 and 5. Finally, an IP address "192.168.1.14" is allocated to the apparatus 7.

The operation sequence of the IP address distribution of the IP address distribution apparatus 8 is illustrated in FIG. 12. The IP address distribution apparatus 8 generates an IP address distribution message in which 192.168.1.200 is stored as a distribution IP address, the MAC address of the apparatus 7 is stored as the transmission destination address, and the MAC address of itself (the IP address distribution apparatus 8) is stored as the transmission source address and transmits the IP address distribution message. The IP address distribution message is relayed by the switches 9 and 5 and reaches the apparatus 7. When relaying the IP address distribution message, the switches 9 and 5 rewrite the distribution IP address. Specifically, since the switch 9 relays the IP address distribution message to the port P5 that is connected to the switch 5, the switch 9 rewrites the distribution IP address from 192.168.1.200 to 192.168.1.25 according to the conversion table illustrated in FIG. 11. Since the apparatus 7 is connected to the port P4, the switch 5 rewrites the distribution IP address from 192.168.1.25 to 192.168.1.14 according to the conversion table illustrated in FIG. 8. As a result, 192.168.1.14 is allocated to the apparatus 7.

The IP address distribution message issued by the IP address distribution apparatus 1 and the IP address distribution message issued by the IP address distribution apparatus 8 are transmitted to the apparatus 7. The apparatus 7 sets the IP address allocated by the IP address distribution message which has been received first as its IP address and starts IP communication. In addition, the switch 5 performs a rewriting process corresponding to an output port. Therefore, the same IP address is allocated, regardless of which of the IP address distribution message transmitted by the IP address distribution apparatus 1 and the IP address distribution message transmitted by the IP address distribution apparatus 8 arrives first.

An operation when an IP address is distributed to other apparatuses is the same as described above.

As such, the IP address distribution system according to this embodiment includes two IP address distribution apparatuses. Therefore, the same effect as that in the first and second embodiments is obtained. In addition, even when a failure occurs in one of the IP address distribution apparatuses, the effect of continuously distributing an IP address is obtained. In the above-described embodiment, two IP address distribution apparatuses are provided. However, two or more IP address distribution apparatuses may be provided. In this case, it is needles to mention that a failure redundancy can be improved.

Fourth Embodiment

Figure 13:
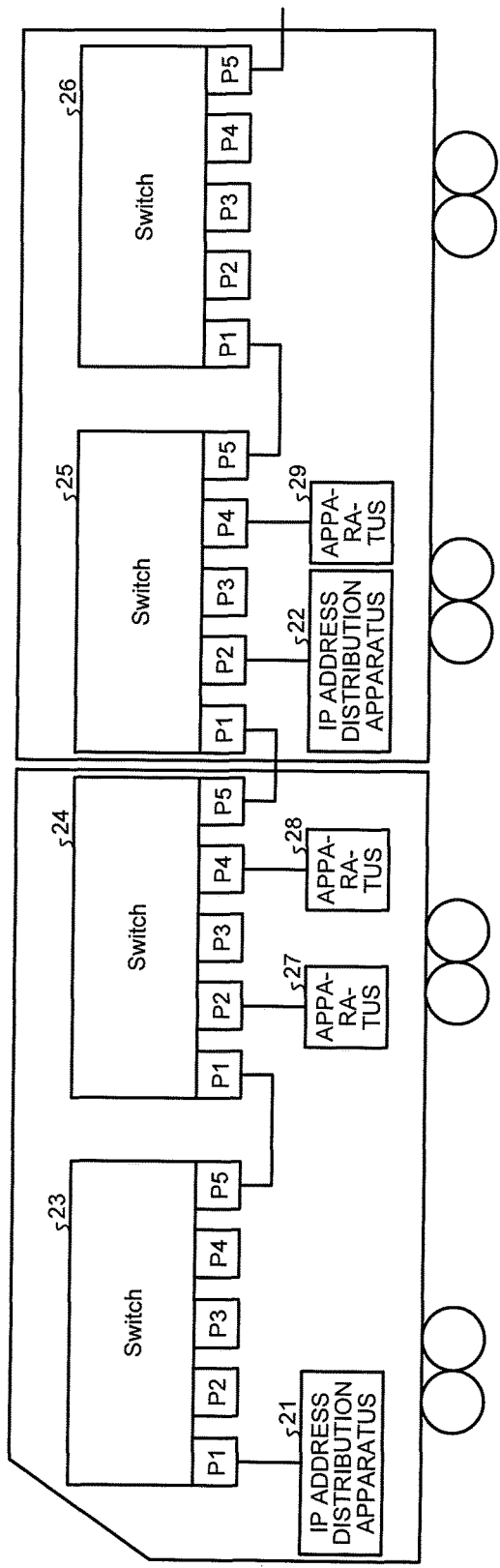
FIG. 13 is a diagram illustrating an application example of the IP address distribution system.

FIG. 13 is a diagram illustrating an application example of the IP address distribution system according to the present invention and illustrates, for example, a case in which the IP address distribution system is applied to a train including a plurality of cars.

FIG. 13 illustrates an example in which an IP address distribution apparatus 21, switches 23 and 24, and apparatuses 27 and 28 are provided in a first car, and an IP address distribution apparatus 22, switches 25 and 26, and an apparatus 29 are provided in a second car.

The switches 23 to 26 each have a distribution IP address conversion table corresponding to a car number and the installation position of the switch in the car. In the distribution IP address conversion table, for example, a value corresponding to the car number is set at the position of a specific bit of the IP address. For example, the value corresponding to the car number is written in the bits from the lower 16 bits to the lower 9 bits of the IP address.

An operation of distributing an IP address to each of the apparatuses 27 to 29 is the same as that in the third embodiment.

For the distribution IP address conversion table, all of the distribution IP address conversion tables used by corresponding organizations in the switch may be prepared and switched by using contact information (not illustrated) contained in the switch. In this case, when a switch is out of order and is replaced, the contact information is set to the same value and used. Therefore, it is made possible to shorten the replacement operation time.

As such, in the case in which the IP address distribution system is applied to the train, even when an apparatus is replaced due to, for example, a failure, it is possible to allocate the same IP address as that of the apparatus before replacement to the replaced apparatus.

In this embodiment, the IP address distribution system according to the third embodiment is applied. However, the IP address distribution system according to the first embodiment or the second embodiment may also be applied to the train.

INDUSTRIAL APPLICABILITY

As described above, the IP address distribution system according to the present invention is useful for a case in which an IP address needs to be managed and allocated considering the physical configuration of a network.

REFERENCE SIGNS LIST 1, 8, 21, 22 IP address distribution apparatus
2, 5, 9, 23 to 26 switch
3, 4, 7, 10, 11, 27 to 29 apparatus

The invention claimed is:

1. An Internet Protocol (IP) address distribution system comprising:
  a network formed by a plurality of the switch apparatuses; and
  an IP address distribution apparatus connected to the network,
  wherein, responsive to receiving an IP address distribution message including a distribution IP address, which is an IP address to be distributed to an apparatus that requests the IP address by the IP address distribution apparatus, each of the plurality of the switch apparatuses rewrites one part or entire of the distribution IP address included in the received IP address distribution message to a value corresponding to a port that relays the IP address distribution message and transmits the rewritten distribution IP address toward the requesting apparatus, and
  each of the plurality of the switch apparatuses rewrites the distribution IP address according to different rules such that the distribution IP address rewritten by one of the switch apparatuses does not overlap the distribution IP address rewritten by another of the switch apparatuses.

2. The IP address distribution system according to claim 1,
  wherein at least one of the plurality of switch apparatuses rewrites the distribution IP address to a value unique to the port that relays the IP address.

3. The IP address distribution system according to claim 1,
  wherein a plurality of the IP address distribution apparatuses are provided.

4. The IP address distribution system according to claim 1,
  wherein the network is a network constructed in a train.

5. A switch apparatus connected to an Internet Protocol (IP) address distribution system that includes a plurality of the switch apparatuses and an IP address distribution apparatus, comprising:
  one or more ports,
  wherein, responsive to receiving an IP address distribution message including a distribution IP address, which is an IP address to be distributed to an apparatus that requests the IP address by the IP address distribution apparatus, the switch apparatus rewrites one part or entire of the distribution IP address included in the received IP address distribution message to a value corresponding to one of the one or more ports that relays the IP address distribution message and transmits the rewritten distribution IP address toward the requesting apparatus, and
  the switch apparatus rewrites the distribution IP address according to different rules from the plurality of switch apparatuses such that the distribution IP address rewritten by one of the switch apparatuses does not overlap the distribution IP address rewritten by another of the switch apparatuses.

6. An Internet Protocol (IP) address distribution method that is performed in an IP address distribution system including a network formed by a plurality of switch apparatuses and an IP address distribution apparatus connected to the network, the method comprising:
  determining, by the IP address distribution apparatus, a provisional IP address to be allocated to an apparatus which requests an IP address;
  transmitting, by the IP address distribution apparatus, an IP address distribution message including the determined provisional IP address;
  receiving, by each of the switch apparatuses, the IP address distribution message;
  rewriting, by each of the switch apparatuses, one part or entire of the provisional IP address included in the received IP address distribution message to a value corresponding to a port that relays the IP address distribution message; and
  transmitting, by each of the switch apparatuses, the rewritten IP address distribution message toward the requesting apparatus, and wherein
  in the rewriting, each of the switch apparatuses rewrites the distribution IP address according to different rules such that the distribution IP address rewritten by one of the switch apparatuses does not overlap the distribution IP address rewritten by another of the switch apparatuses.

* * * * *